(12) United States Patent
Summers et al.

(10) Patent No.: US 9,849,403 B2
(45) Date of Patent: Dec. 26, 2017

(54) FRACTIONATION TRAY HAVING A MANWAY UNIT

(71) Applicant: Sulzer Chemtech AG, Winterthur (CH)

(72) Inventors: Daniel Richard Summers, Broken Arrow, OK (US); Salvador Lopez Magana, Tulsa, OK (US); Robert Bowden, Tulsa, OK (US); Charles Sidney Parker, Broken Arrow, OK (US)

(73) Assignee: Sulzer Chemtech AG, Winterthur (CH)

( * ) Notice: Subject to any disclaimer, the term of this patent is extended or adjusted under 35 U.S.C. 154(b) by 46 days.

(21) Appl. No.: 14/714,865

(22) Filed: May 18, 2015

(65) Prior Publication Data

US 2015/0336025 A1 Nov. 26, 2015

Related U.S. Application Data

(60) Provisional application No. 62/002,334, filed on May 23, 2014.

(51) Int. Cl.
*B01D 3/32* (2006.01)
*E06B 3/38* (2006.01)
*E06B 5/00* (2006.01)
*E06B 3/70* (2006.01)

(52) U.S. Cl.
CPC ............ *B01D 3/324* (2013.01); *E06B 3/38* (2013.01); *E06B 5/00* (2013.01); *E05Y 2900/612* (2013.01); *E06B 2003/7046* (2013.01); *E06B 2003/7049* (2013.01)

(58) Field of Classification Search
CPC ..... E06B 5/38; E06B 3/38; E06B 5/00; E06B 2003/7046; E06B 2003/7049; B01D 3/324; E05Y 2900/612
See application file for complete search history.

(56) References Cited

U.S. PATENT DOCUMENTS 2,375,409 A * 5/1945 Glitsch .................... F16B 5/06
220/324
2,611,457 A * 9/1952 Glitsch .................... B01D 3/22
261/114.1
2,611,596 A * 9/1952 Glitsch .................. B01D 3/324
202/158

(Continued)

FOREIGN PATENT DOCUMENTS

DE  102005047818 B3 * 5/2007 .......... E05B 1/0053
GB        1041690 A * 9/1966 ............. B01D 3/163
WO  WO 0025880 A1 * 5/2000 ............. B01D 3/324

*Primary Examiner* — Amber R Orlando
*Assistant Examiner* — Stephen Hobson
(74) *Attorney, Agent, or Firm* — Larson & Anderson, LLC (57) ABSTRACT

A fractionation tray includes a manway unit positioned to cover a manway opening in the fractionation tray. The manway opening is framed by one or more fractionation tray panels having apertures therethrough adjacent to the manway opening. The manway unit includes a first manway panel having: perforations for the passage of fluid; first and second opposing side edges and two opposing end edges; and finger elements extending from the second side edge. The finger elements of the second side edge are received within the apertures adjacent to a first side of the manway opening. The manway unit is configured to open and close by rotation of the finger elements within the apertures.

23 Claims, 6 Drawing Sheets

(56) References Cited

U.S. PATENT DOCUMENTS

| | | | | |
|---|---|---|---|---|
| 2,681,820 A * | 6/1954 | Leety | ............. | B01D 3/18 |
| | | | | 261/114.1 |
| 2,875,867 A * | 3/1959 | Hart | ............. | B01D 3/22 |
| | | | | 261/114.1 |
| 2,931,469 A * | 4/1960 | Sowles | ............. | B01D 3/22 |
| | | | | 261/113 |
| 3,891,253 A * | 6/1975 | Revell | ............. | E05C 3/00 |
| | | | | 292/336.3 |
| 4,120,919 A * | 10/1978 | McClain | ............. | B01D 3/22 |
| | | | | 202/158 |
| 4,133,852 A * | 1/1979 | DiNicolantonio | ............. | B01D 3/22 |
| | | | | 137/513.3 |
| 4,294,049 A * | 10/1981 | Young | ............. | E02D 29/1427 |
| | | | | 261/114.5 |
| 6,267,359 B1 * | 7/2001 | Stippick | ............. | B01D 3/326 |
| | | | | 261/114.5 |
| 6,592,106 B1 * | 7/2003 | Eaton, Jr. | ............. | B01D 3/324 |
| | | | | 261/114.3 |
| 6,629,687 B1 * | 10/2003 | Gage | ............. | B65D 90/10 |
| | | | | 202/270 |
| 7,779,587 B1 * | 8/2010 | Meyer | ............. | E04B 5/43 |
| | | | | 292/195 |
| 8,292,540 B2 * | 10/2012 | Pickavance | ............. | E02D 29/14 |
| | | | | 137/371 |
| 8,763,313 B2 * | 7/2014 | Lyness | ............. | E04H 12/00 |
| | | | | 52/192 |
| 2010/0288624 A1 * | 11/2010 | Kim | ............. | B01D 3/326 |
| | | | | 203/87 |
| 2016/0296854 A1 * | 10/2016 | Thakur | ............. | B01D 3/324 |

* cited by examiner

FRACTIONATION TRAY HAVING A MANWAY UNIT

BACKGROUND

The present invention is directed to fractionation columns and, more particularly, to fractionation trays having manways.

Fractionation trays are used in fractionation columns to facilitate contact and interaction between ascending vapor streams and descending liquid streams. A plurality of fractionation trays are normally installed in a vertically spaced apart relationship within the column. Each tray typically extends horizontally across the entire cross-section of the column and is supported by rings or other supports welded to the inner surface of the column shell.

Fractionation trays are frequently provided with manways that can be opened to provided a temporary vertical passageway through the trays once they have been installed within the column. The manways are typically formed by an opening in each tray deck and an overlying cover formed by one or more removable panels. When internal access to the column is needed for inspection, cleaning, and/or maintenance purposes the manway covers are removed from the trays and a person is able to pass vertically through the trays and the column.

One manway cover, that remains in widespread use, utilizes numerous bolting assemblies to releaseably secure the manway cover to the overlapped edges of the surrounding tray panels. The bolting assemblies typically include a rectangularly shaped flat washer that is positioned on a vertical bolt that passes through the overlapped portions of the manway cover and apertures within the tray panels. Nuts are subsequently threaded on the opposite ends of the bolts and tightened to secure the cover to the surrounding tray panels.

While this manway and cover design is simple to use and reliable, opening and closing of the manway cover is a time consuming process as each bolting assembly of the respective manway needs to be tightened or loosened before the manway cover is opened or closed. This problem is compounded due to the large number of fractionation trays contained within any given column.

Manway designs which facilitate quicker opening and closing than those discussed above are disclosed in U.S. Pat. Nos. 4,120,919 and 6,629,687. The manway disclosed in the '919 patent utilizes a cover formed from two panels that are joined together by a center hinge. The lateral margins of the panels are releaseably secured beneath clips that are welded or otherwise secured to the edges of the adjacent tray panels. The ends of the cover are releaseably secured to the adjacent end panels by a handle arrangement. When removal of the manway cover is desired, the handles are turned to release the cover from the end panels and the center hinge allows the cover panels to be folded upwardly, thereby releasing the lateral margins of the panels from the clips and the entire manway cover can be removed from the fractionation tray.

The manway disclosed in the '687 patent likewise utilizes a cover formed from two panels that are joined together by a center hinge. The lateral margins of the cover panels have upturned flanges that are releaseably secured beneath U-shaped brackets affixed to the fractionation tray deck adjacent the manway opening. Each of the U-shaped brackets are bolted, via a pair of bolting assemblies, to the edges of the adjacent fractionation tray panels. When the cover is opened the upturned flanges of the cover panels slide out of the U-shaped brackets bolted to the fractionation tray and the entire manway cover can be removed from the fractionation tray.

While the manway designs described in the '919 and '687 patents allow for quicker opening and closing of the manway covers, additional hardware must be provided and modifications must be made to the adjacent fractionation tray panels in order to install the manway covers (e.g. welding or bolting of brackets/clips to the fractionation tray). In addition, folding of the center hinge during removal of the cover in the '919 patent initially causes a slight outward movement of the cover panels and may cause them to become tightly wedged and difficult to remove from beneath the clips. Furthermore, both manway designs require complete removal of the manway cover from the fractionation tray when they are opened and thus require subsequent realignment of the manway panel with the manway opening and brackets/clips when closing. This adds additional time requirements when utilizing these manways. Manways for fractionation trays and columns which overcome these problems, among others, are therefore desired.

SUMMARY OF INVENTION

In a first aspect, the present invention provides a fractionation tray comprising a manway unit positioned to cover a manway opening in the fractionation tray. The manway opening is framed by one or more fractionation tray panels having apertures therethrough and adjacent to the manway opening. The manway unit includes a first manway panel having: perforations for the passage of fluid; first and second opposing side edges and two opposing end edges; and finger elements extending from the second side edge. The finger elements of the second side edge are received within the apertures adjacent to a first side of the manway opening. The manway unit is configured to open and close by rotation of the finger elements within the apertures.

In a second aspect of the present invention a method is provided for opening and/or closing a manway unit of the fractionation tray of the present invention. The method includes the step of: opening and/or closing the manway unit by rotating the finger elements of the first manway panel within the apertures of the adjacent fractionation tray panel(s).

A third aspect of the present invention provides a fractionation column which includes one or more of the fractionation trays described herein. In a fourth aspect of the present invention a method of traveling through this fractionation column is provided. The method includes the human performed steps of: (i) entering the fractionation column; (ii) opening a manway unit of a first fractionation tray by rotating the finger elements of the manway panel within the apertures of the adjacent fractionation tray panel(s); and (iii) traveling through the manway unit of the first fractionation tray.

In a fifth aspect of the present invention a method for retrofitting a fractionation tray having an existing manway unit with a new manway unit, is provided. The method includes the steps of: (i) providing a fractionation tray having the existing manway unit positioned to cover a manway opening of the fractionation tray, wherein: the manway opening is framed by one or more fractionation tray panels having apertures through the panel(s) adjacent to the manway opening, and the existing manway unit is secured to the fractionation tray by one or more bolting assemblies disposed through the apertures; (ii) removing, sliding away, or turning away the one or more bolting assemblies and removing the existing manway unit from the fractionation tray; (iii) providing a new manway unit as described herein; and (iv) installing the new manway unit by inserting the finger elements of the first manway panel into the apertures of the adjacent fractionation tray panel(s).

In a sixth aspect, the present invention provides a method of retrofitting a fractionation tray having an existing manway unit. The method includes the steps of: (i) providing a fractionation tray having the existing manway unit positioned to cover a manway opening of the fractionation tray, wherein: the manway opening is framed by one or more fractionation tray panels having apertures through the panel(s) adjacent to the manway opening, and the existing manway unit having one or more manway panels secured to the fractionation tray by one or more bolting assemblies disposed through the apertures; (ii) removing, sliding away, or turning away the one or more bolting assemblies and removing the existing manway unit from the fractionation tray; (iii) installing finger elements on one or more sides of the manway panel(s) thereby creating a modified manway unit, wherein the modified manway unit is configured to open and close by rotation of the finger elements within the apertures, and (iv) installing the modified manway unit by inserting the finger elements into the apertures of the adjacent fractionation tray panel(s), thereby retrofitting a fractionation tray having an existing manway unit with a new manway unit.

DETAILED DESCRIPTION OF THE INVENTION

The present invention solves problems and cures difficulties associated with manways for fractionation trays of the prior art. The present invention provides, inter alia, fractionation trays having quick opening/closing manway units and ways of modifying existing fractionation trays with quick opening/closing manway units. The quick opening/closing manway units require no physical modifications to the fractionation tray (e.g. such as securing brackets to the tray deck via welds, bolting assemblies, or other attachment means) and make use of existing tray infrastructure including existing apertures through the fractionation tray panel(s) adjacent to the manway opening. These features allow for time and material/hardware savings.

The quick opening/closing manway units are configured to be openable or closeable in less than 5 minutes, for example less than 1 minutes or less then 30 seconds, or more preferably less than 15 seconds. The manway units of the present invention also contain manway panel(s) which can be, but do not need to be, physically removed from the fractionation tray when opening the manway unit and traveling through the manway. This allows for additional time savings when opening and closing the manway unit as the manway panels need not be physically removed from the fractionation tray upon opening or subsequently realigned with the manway opening or securing means (e.g. brackets) upon closure of the unit.

Plants having one or more fractionation columns equipped with fractionation trays having the quick opening/closing manway units described herein can be operated with more efficiency than those which do not employ such devices. In particular when there is a need for column inspection and/or cleaning, the down time and man hours required to perform these events is minimized. These savings are magnified at plants employing fractionation columns which require frequent inspection and/or cleaning.

Figure 1:
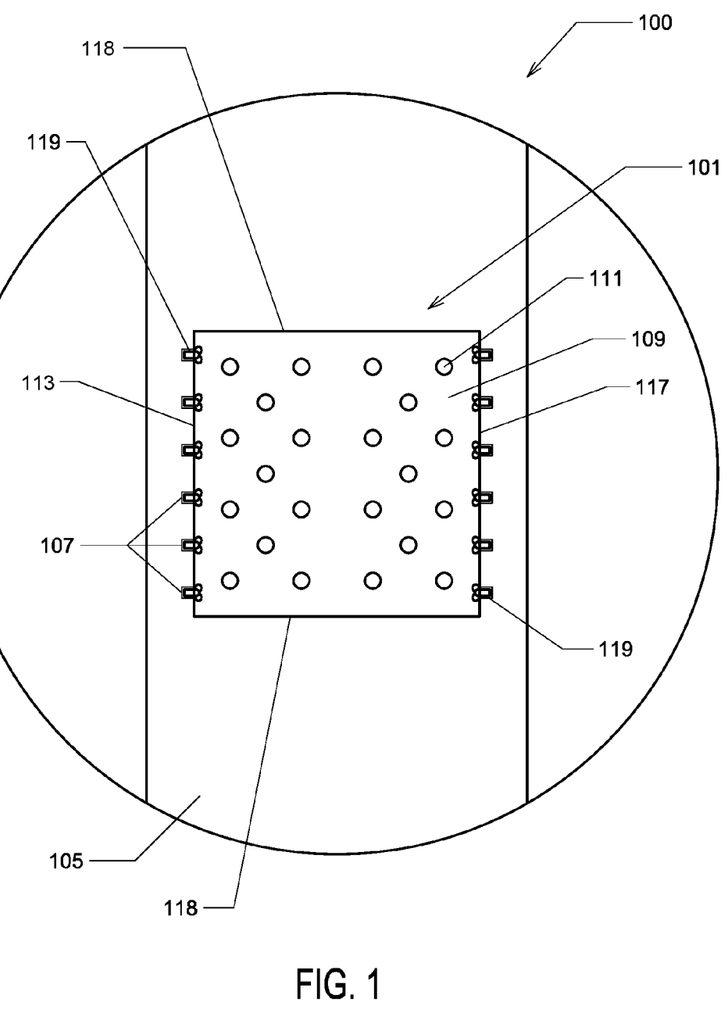
FIG. 1 is a top elevation view of a fractionation tray containing a manway unit according to the present invention.

The Trays, Columns, and Manway Units of the Present Invention:

As shown in FIG. 1, a first embodiment of the present invention provides a fractionation tray 100 having a manway unit 101 positioned to cover a manway opening of the tray 100. The manway opening of the fractionation tray 100 is framed by one or more fractionation tray panels 105 having apertures 107 through the panel(s) 105 adjacent to the opening. In certain embodiments, apertures 107 were previously intended/used to secure prior art manway covers to the tray via use of bolting assemblies (e.g. nut, bolt, washer, and combinations thereof). When these prior art fractionation trays are retrofit with the manway units described herein, installation of the new manway unit can be done without requiring any physical modifications to the tray (other than removal of the existing manway unit/cover, if present, and providing the manway unit described herein) and without requiring any additional hardware (e.g. bolting assemblies, brackets, welds, other securing means, cuts, punches, etc.).

In FIG. 1, the manway unit 101 includes a first manway panel 109 having perforations 111 for the passage of fluid. The first manway panel 109 has first 113 and second 117 opposing side edges and two opposing end edges 118. One or more finger elements 119 extend from the second side edge 117 and each finger element 119 is configured for insertion into and is received within an aperture 107 of the fractionation tray on a first side of the manway opening. The manway unit 101 is configured to open and close by rotation of the finger element(s) 119 of the manway panel(s) within the apertures 107. For example, when opening the manway unit 101, an upward force is applied toward the first side edge 113 of the manway panel (e.g. by pushing from beneath or pulling from above) which causes rotation of the finger elements 119 of the second side edge 117 of the manway panel 109 within the apertures 107. This rotation is accompanied by movement of the first side edge 113 of manway panel 109 away from the fractionation tray 100 thereby opening the manway unit.

FIG. 1 shows another embodiment wherein finger elements 119 also extend from the first side edge 113 of the first manway panel 109. Similar to the finger elements of the second side edge of the manway panel, each finger element 119 of the first side is configured for insertion into and is received within an aperture 107 of the fractionation tray but on a second side of the manway opening (e.g. opposed to the first side of the manway opening). In the present embodiment, the manway unit 101 is configured to open and close by rotation of the finger elements 119 extending from either the first side edge 113 or the second side edge 117 of the first manway panel 109 within the apertures 107 of the respective side of the manway opening in a fashion similar to that described above.

Figure 2:
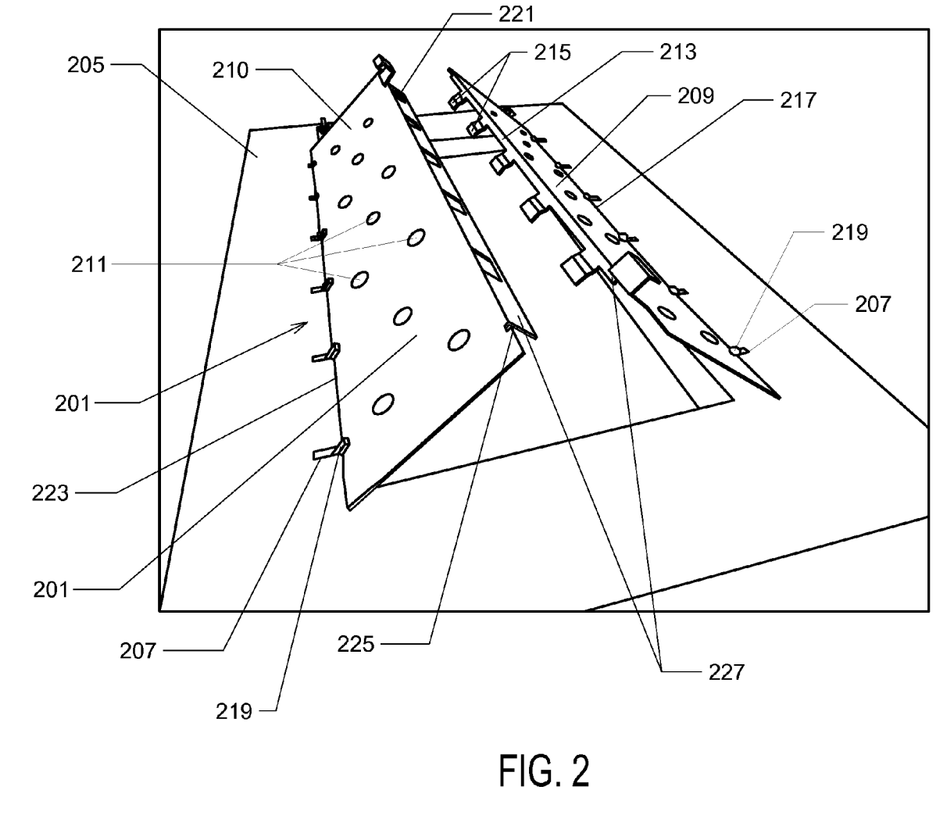
FIG. 2 is an isometric view of a fractionation tray panel containing a manway unit in a partially open position according to the present invention.

FIG. 2 shows another embodiment of a manway unit 201 which employs two manway panels 209 and 210. Each panel (209, 210) has perforations 211 for the passage of fluid from one major surface to the other (e.g. through the panel). Each panel (209, 210) has first (213, 225) and second (217, 223) opposing side edges and two opposing end edges. The second side edges (217, 223) of the first 209 and second panels 210 each have finger elements 219 which are configured for insertion into and received within apertures 207 of an fractionation tray panel(s) 205 adjacent to respective sides of the manway opening. The manway unit as shown in FIG. 2 is configured to open and close by rotation of the finger element(s) 219 of both the first 209 and second 210 manway panels within the apertures 207 of the adjacent fractionation tray panel(s) 205 in a manner similar to that described above. Furthermore, when the manway unit 201 is in a closed position the first side edges (213, 225) of the first and second manway panels (209, 210) are substantially aligned along a midline of the manway opening which extends parallel to and between the first and second sides of the manway opening.

FIG. 2 also shows an embodiment wherein the first side edge 213 of the first manway panel 209 includes one or more claw elements 215 each of which are configured for insertion into an aperture 221 of the first side edge 225 of the second manway panel 210. When the manway unit is in a closed position the claw element(s) 215 of the first panel 209 are received within the aperture(s) 221 of the second manway panel 210. Again, opening of the manway unit is accomplished by providing and upward force to both the first 209 and second 210 panels (either sequentially or at the same time) wherein first sides of each panel rotate about a respective pivot (e.g. the second side of the respective panel) and the claw element(s) 215 become disengaged from the slot(s) 221.

FIG. 2 also shows an embodiment where the first side edges (213, 225) of each the first 209 and second 210 manway panels are downwardly folded from the panel (e.g. about 90°+/−10°) to form a downwardly folded edge portions 227. In this embodiment, the slot(s) 221 which are configured for receiving claw element(s) 215 reside within the downwardly folded edge portion 227 of the first side 225 of the second panel 210. Furthermore, in the present embodiment, claw elements 215 extend from the folded edge portion 227 of the first side 213 of the first manway panel 209.

The manway units described herein have a length dimension extending perpendicularly between the opposing end edges of the panel(s) and across a corresponding length dimension of the manway opening of the fractionation tray. Furthermore, the manway units described herein have a width dimension extending perpendicularly between the opposing side edges of the first manway panel (if only one manway panel is employed) or between the second edges of the first and second manway panels (when two manway panels are employed). The width dimension of the manway unit also extends across a corresponding width dimension of the manway opening of the fractionation panel. Preferably the length dimension of the manway unit is greater than the corresponding length dimension of the manway opening of the fractionation panel, so as to provide overlap between the manway panel(s) and the fractionation tray. It is further preferable that the width dimension of the manway unit is greater than the corresponding width dimension of the manway opening of the fractionation tray, so as to provide additional overlap between the manway panel(s) and the fractionation tray. Where overlap exists between the manway panel and the fractionation tray occurs it is preferably less than 30 mm, for example 5 mm or more, such as 10 mm or more on each side. It is noted however, that the width dimension of the manway unit should be selected such that the finger elements of the panels be allowed to be received within the apertures adjacent to the manway opening to allow and ensure proper opening and closing of the manway unit. These described overlaps between the manway panel(s) and fractionation tray are believed to provide additional structural integrity to the manway units (e.g. when in a closed position) and to prevent unintentional fluid flow through gaps between the manway opening and the manway unit during operation of the tray.

Figure 3:
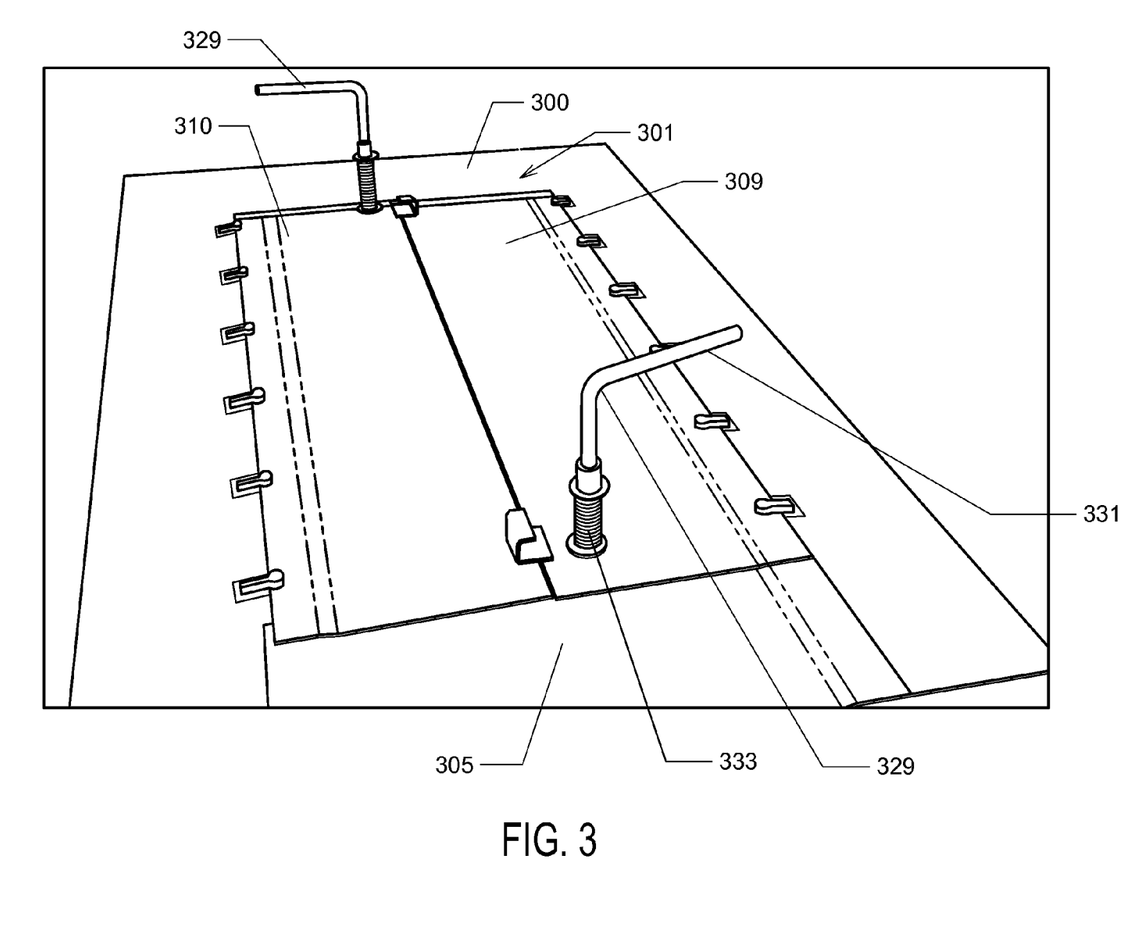
FIG. 3 is an isometric view of a fractionation tray panel containing a manway unit in a closed position according to the present invention.

FIG. 3 shows a further embodiment of a manway unit 301 wherein one or more spring loaded handles 329 are present for securing the manway panel(s) (e.g. first 309 and second 310 manway panels) in a closed position. The spring loaded handle 329 includes a spring 333 and a handle member 331 which extends through the first manway panel 309. The handle member 331 is rotatable between a locked position and an unlocked position. When the handle member 331 is in the locked position it is engaged with both the manway panel 309 and the fractionation tray to secure the manway unit 301 in a closed position. When the handle member 331 is in the unlocked position it is engaged only with the manway panel 309 to allow for opening and closing of the manway unit 301. The handle member 331 can be configured to interact with the fractionation tray at a variety of locations. For example the handle member 331 can be configured to interact with: the underside of an adjacent fractionation tray panel 305; a strut or a truss which supports an adjacent fractionation tray panel 305; or both. In any event, the spring loaded handle provide a biasing or locking interaction which prevents opening of the manway unit when in a closed position. The spring 333 likewise provides a biasing force to maintain the handle member 331 in its current configuration (e.g. either the locked or open position). Preferably the handle member contains a user engagement surface on the undersurface of the panel 309 so as to ensure the handle is rotatable and the unit is openable/closeable from either side (top or bottom) of the tray 300.

Figure 4:
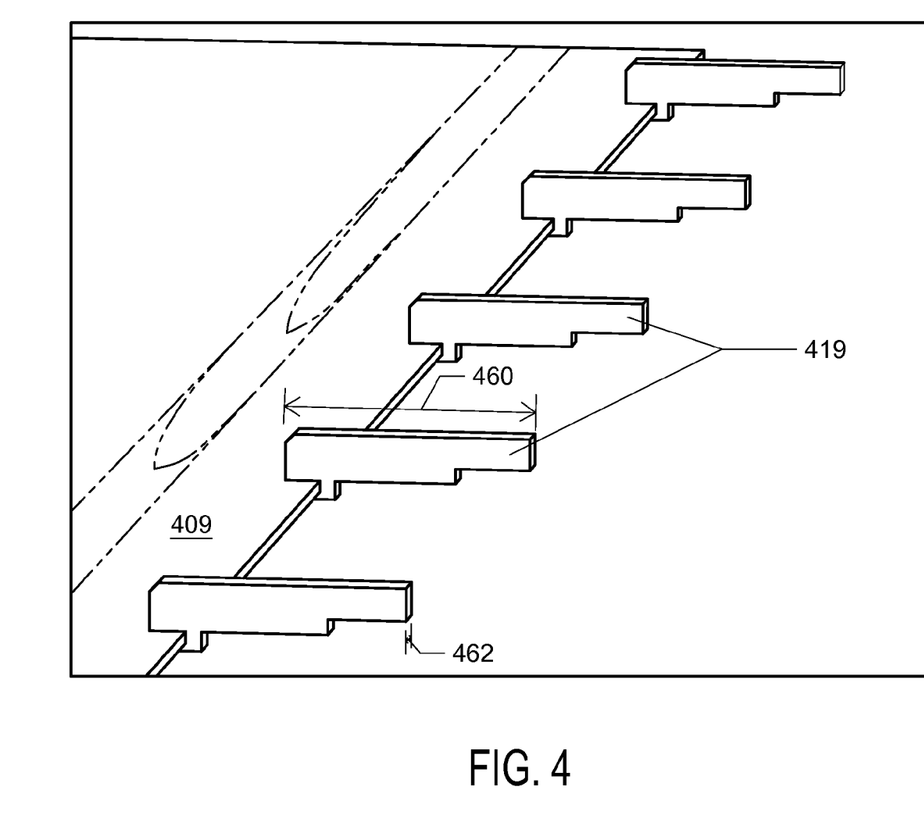
FIG. 4 is an isometric view of the underside of a manway panel of the present invention showing finger elements extending from an edge thereof.
Figure 5:
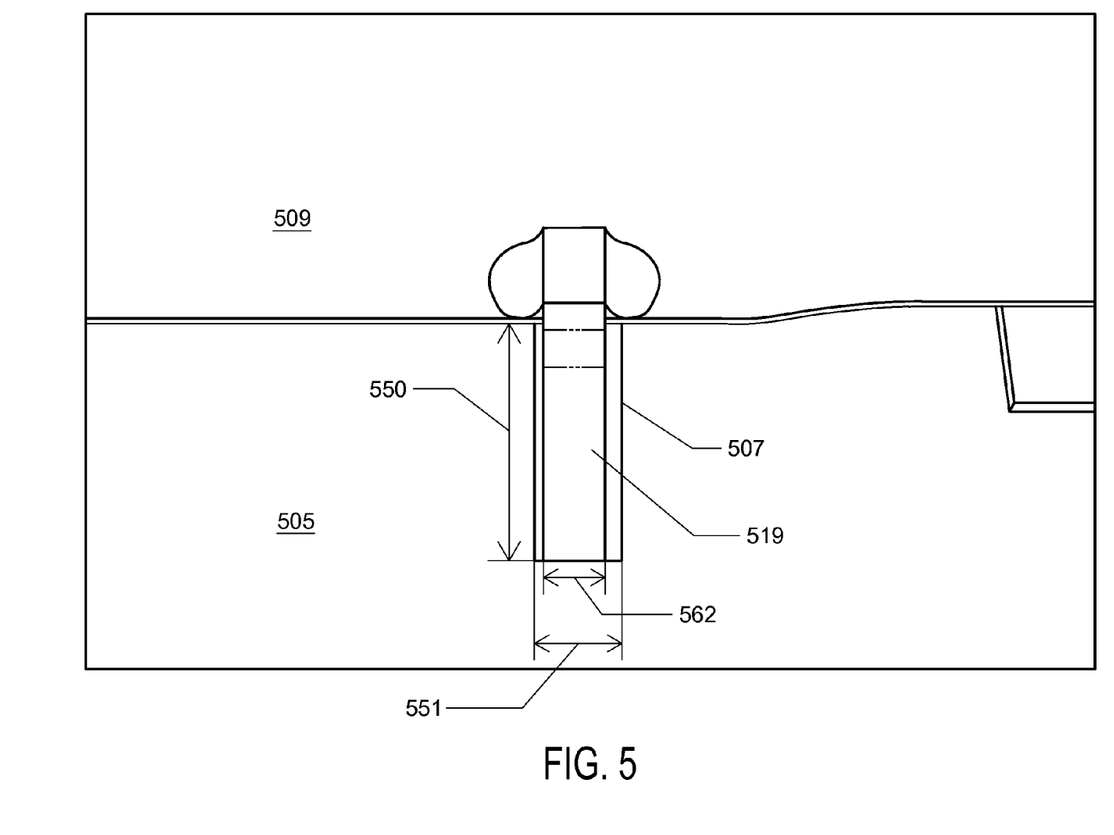
FIG. 5 is an isometric view of a fractionation tray panel containing a manway unit panel having finger elements extending from an edge thereof and into apertures of a fractionation tray panel adjacent a manway opening in an according to the present invention.

FIGS. 4 and 5, show additional embodiments of finger elements (419, 519) of manway panels (409, 509) and corresponding apertures 507 of an adjacent fractionation tray panel 505. As shown in these figures, the apertures 507 through the fractionation tray panel 507 have length 550 and width 551 dimensions and take the form of slots through the fractionation tray adjacent to the manway opening. The finger elements (419, 519) of the manway panel(s) 509 have corresponding length 460 and width (462, 562) dimensions and are shown in FIG. 4 to project slightly downwardly from the underside of panel 409 and substantially parallel to the major surfaces of the panel 409 (e.g. note FIG. 4 is a bottom view of the panel 409). Preferably, the length dimension 460 of the finger elements (419, 519) is greater than the length dimension 550 of the apertures 507 through the fractionation tray 505. Furthermore, the width dimension (462, 562) of the finger elements (419, 519) is equal to or less than the width dimension 551 of the apertures through the fractionation tray 505.

In the embodiments shown in FIGS. 4 and 5, when the finger elements (419, 519) are longer than the corresponding length of apertures 507, the manway panel(s) can be installed by inserting the finger elements of the panels into apertures 507 when the panel(s) is in a slightly, partly, mostly, or completely opened position. For example when the manway panel(s) is in one of these opened positions it can be anywhere from 20° to 160°, for example between 45° to 135°, such as between 70° to 110°, or be substantially perpendicular (e.g. 90°+/−5° to 10°), with respect to the fractionation tray. In some preferred embodiments, the manway panel(s) are installed by inserting the finger elements of the panels into apertures 507 when the panel(s) is substantially perpendicular (e.g. 90°+/−5° to 10°), with respect to the fractionation tray.

Figure 6:
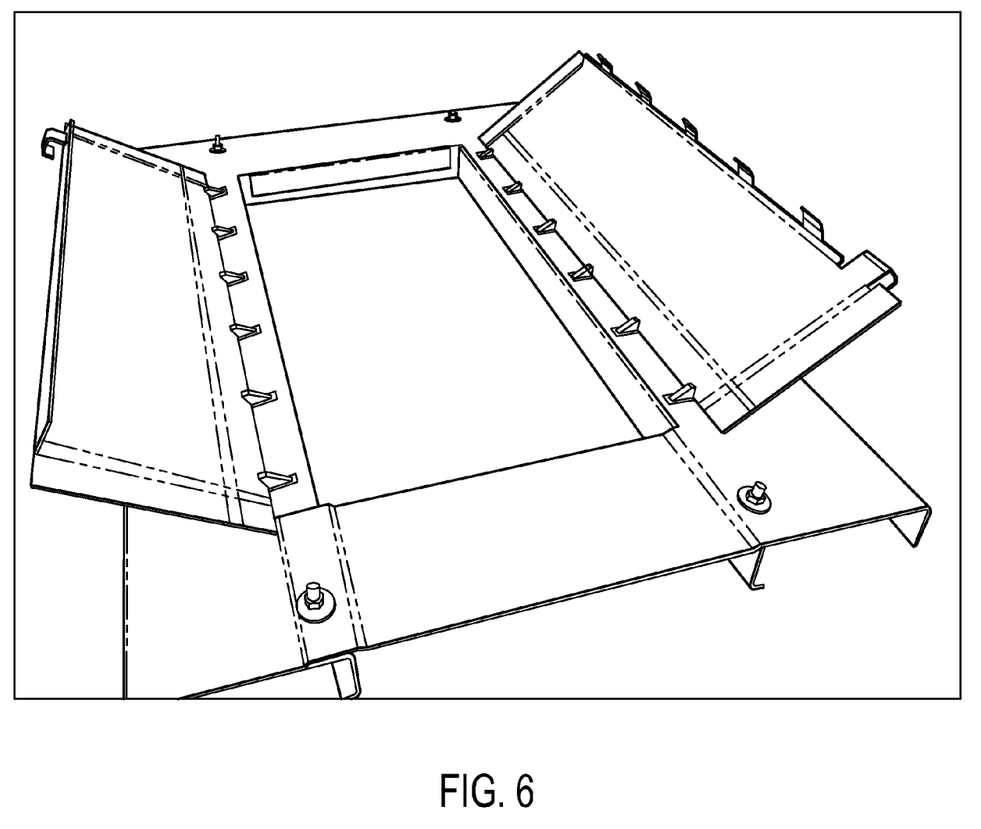
FIG. 6 is a top view of a fractionation tray panel containing a manway unit in an open position according to the present invention.

While the panel(s) can subsequently and intentionally be removed from the tray by physically pulling up on the panel (409, 509) when it is in an opened position, the panel is prevented from being disengaged from the tray during normal opening and closing of the manway unit and especially when the manway unit is in a closed position. Again where the finger elements (419, 519) are longer than the corresponding length of apertures 507, the finger elements make contact with the underside of the tray when the manway unit is in a closed position or completely open position (see FIG. 6). This feature provides an interaction between the finger elements (and hence the manway panel) and the adjacent fractionation tray panel(s) so as to keep the second edge of the manway panel secured with/to the tray when the manway unit is in a closed or fully opened position (see FIG. 6). In particular this feature allows the manway panel(s) of the manway unit of the present invention to remain in contact/engagement with the fractionation tray and in alignment with the manway opening of the tray and provides time savings both when opening and closing the manway unit.

The manway units of the present invention have perforations through the manway panels for the passage of fluid. The fractionation trays likewise have perforations through the tray panels for the passage of fluid. In preferred embodiments, the perforations of the manway panels are selected to match the perforations of the adjacent fractionation tray panels.

The Methods of the Present Invention:

The present invention also provides a method for opening and/or closing any of the manway units described herein. The method comprises the step of: (i) opening and/or closing the manway unit of the respective tray by rotating the finger elements of the manway panel(s) within the apertures of the adjacent fractionation tray panel(s).

In a further aspect, the present invention provides a method of human travel through the fractionation column comprising a fractionation tray equipped with any of the manway units described herein. The method comprises the human performed steps of: (i) entering the fractionation column; (ii) opening the manway unit by rotating the finger element(s) of the manway panel(s) within the apertures of the adjacent fractionation tray panel(s); and (iii) traveling through the manway unit and manway opening of the fractionation tray. Preferably, the fractionation column will contain more than one fractionation tray having the manway units herein described. Where it does, the method further comprises the human performed steps of: (iv) opening a manway unit of a second fractionation tray by rotating the finger elements of the manway panel within the apertures of the adjacent fractionation tray panel(s); and (v) traveling through the manway unit of the second fractionation tray.

In yet a further aspect, the present invention provides a method for retrofitting a fractionation tray (e.g. optionally contained within an fractionation column) with any of the manway units described above. The method comprises a first step of (i) providing a fractionation tray having an existing manway unit installed within an opening of the fractionation tray. The opening being framed by one or more fractionation tray panels having apertures through the panel(s) adjacent to the opening. The existing manway unit is secured within the opening of and to the fractionation tray by one or more bolting assemblies disposed through the apertures. A second step of the present method includes (ii) removing the one or more bolting assemblies and removing the existing manway unit from the fractionation tray. Where the apertures are of sufficient size or length (e.g. a slot) to accommodate both the bolting assembly and the finger elements of the manway panel(s) described herein, it is possible that the bolting assembly need not be completely removed from the tray. For example, in the present embodiment, the bolting assembly may be loosened and slid or turned out of the way, so that the existing manway panel(s) may be removed and the finger elements of the manway panel(s) described herein can be inserted in the aperture (see the third step). A third step of the present invention includes (iii) installing any of the manway units described above within the opening. The third step can be accomplished by aligning and inserting the finger elements of the manway panel(s) in a top down manner into the apertures of the fractionation tray panel adjacent to the manway opening and then rotating the manway panel(s) to the closed or fully open position. Preferably, the present method requires no additional modification to the tray and the provision of no additional hardware (e.g. welding of brackets, clips, etc. or bolting assemblies etc.) except for removal of the existing manway unit and the provision of the new manway unit.

In yet a further embodiment, the present invention provides a method for retrofitting a fractionation tray (e.g. optionally contained within an fractionation column) with any of the manway units described above. In the present embodiment, the existing manway unit installed within an opening of the fractionation tray can be modified to introduce the herein described finger elements to the side edges of the existing manway unit panels. Here, the method includes a first step of (i) providing a fractionation tray having an existing manway unit installed within an opening of the fractionation tray. The opening being framed by one or more fractionation tray panels having apertures through the panel(s) adjacent to the opening. The existing manway unit includes a manway unit panel that is secured within/covering the opening of and to the fractionation tray by one or more bolting assemblies disposed through the apertures. A second step of the present method includes (ii) removing, sliding, or turning away of the one or more bolting assemblies and removing the existing manway unit from the fractionation tray. A third step of the present invention includes (iii) modifying the existing manway unit panel by installing (e.g. welding, bolting, clipping, attaching, etc.) the herein described finger elements to one or more sides of the manway panel(s) thereby creating a modified manway unit which is configured to open and close by rotation of the finger elements within the apertures. A fourth step of the present method includes (iii) installing the modified manway unit described above within/covering the opening. The fourth step can be accomplished by aligning and inserting the finger elements of the modified manway panel(s) in a top down manner into the apertures of the fractionation tray panel adjacent to the manway opening and then rotating the modified manway panel(s) to the closed or fully open position. Preferably, the present method requires no additional modification to the fractionation tray and the provision of no additional hardware (e.g. welding of brackets, clips, etc. or bolting assemblies etc.) except for removal of the existing manway unit and the modification thereof to install the herein described finger elements to the manway unit.

Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner with any other of the various embodiments.

The invention claimed is:

1. A fractionation tray comprising a manway unit positioned to cover a manway opening in the fractionation tray, the manway opening being framed by one or more fractionation tray panels having apertures therethrough from one major surface to another major surface adjacent to the manway opening, the manway unit comprising:
   (i) a first manway panel comprising:
      perforations for the passage of fluid;
      first and second opposing side edges and two opposing end edges; and
      finger elements extending from the second opposing side edge, wherein the finger elements of the second opposing side edge are received within the apertures adjacent to a first side of the manway opening,
   wherein the manway unit is configured to open and close by rotation of the finger elements within the apertures.

2. The fractionation tray of claim 1, wherein the first manway panel further comprises finger elements extending from the first opposing side edge, wherein the finger elements of the first opposing side edge are received within the apertures adjacent a second side of the manway opening,
   wherein the manway unit is configured to open and close by rotation of the finger elements extending from either the first opposing edge or the second opposing edge of the first manway panel within the apertures.

3. The fractionation tray according to claim 1, further comprising a spring loaded handle comprising a spring and a handle member extending through the first manway panel, wherein the handle member is rotatable between a locked position and an unlocked position, wherein when the handle member is in the locked position the handle member is engaged with the first manway panel and a fractionation tray panel, a supporting truss adjacent to the manway opening, or both a fractionation tray panel and a supporting truss adjacent to the manway opening to secure the manway unit in a closed position, and wherein when the handle member is in the unlocked position the handle member is engaged only with the first manway panel to allow for opening and closing of the manway unit.

4. The fractionation tray of claim 1, wherein the manway unit further comprises:
   (ii) a second manway panel having:
      perforations for the passage of fluid;
      first and second opposing side edges and two opposing end edges; and
      finger elements extending from the second opposing side edge, wherein the finger elements of the second side opposing edge are received within the apertures adjacent a second side of the manway opening opposed to the first side of the manway opening,
   wherein the manway unit is configured to be openable and closeable by rotation of the finger elements of the first and second manway panels within the apertures, and
   wherein when the manway unit is in a closed position the first opposing side edges of the first and second manway panels are substantially aligned along a midline of the manway opening which extends parallel to and between the first side and the second side of the manway opening.

5. The fractionation tray of claim 4, wherein the manway unit further comprises:
   one or more claw elements extending from the first opposing side edge of the first manway panel; and
   one or more slots for receiving the one or more claw elements are positioned toward the first opposing side edge of the second manway panel,
   wherein when the manway unit is in a closed position the one or more claw elements are received within the one or more slots to interlock the first and second manway panels about the first opposing side edges.

6. The fractionation tray of claim 5, wherein the first opposing side edges of the first and second manway panels are folded downwardly from the respective manway panel to form downwardly folded first opposing edge portions, wherein the one or more claw elements of the first manway panel extend from the downwardly folded first opposing edge portion of the first manway panel, and wherein the one or more slots of the second manway panel reside within the downwardly folded first opposing edge portion of the second manway panel.

7. The fractionation tray according to claim 5, further comprising a spring loaded handle, the spring loaded handle comprising a spring and a handle member extending through the first manway panel, wherein the handle member is rotatable between a locked position and an unlocked position, wherein when the handle member is in the locked position the handle member is engaged with the first manway panel and a fractionation tray panel a supporting truss adjacent to the manway opening, or both a fractionation tray panel and a supporting truss adjacent to the manway opening to secure the manway unit in a closed position, and wherein when the handle member is in the unlocked position the handle member is engaged only with the first manway panel to allow for opening and closing of the manway unit.

8. The fractionation tray according to claim 4, wherein:
   the apertures through the fractionation tray adjacent to the manway opening have length and width dimensions,
   the finger elements of the first and second manway panels have corresponding length and width dimensions,
   the length dimension of the finger elements is greater than the length dimension of the apertures through the fractionation tray adjacent to the manway opening,
   the width dimension of the finger elements is equal to or less than the width dimension of the apertures through the fractionation tray adjacent to the manway opening.

9. The fractionation tray of claim 1, wherein the manway unit is configured to be secured in a closed position without the use of a bolting assembly.

10. The fractionation tray of claim 1, wherein the manway unit is configured to be openable in less than one minute and closeable in less than one minute.

11. The fractionation tray of claim 1, wherein the manway unit has a length dimension extending across a corresponding length dimension of the manway opening and a width dimension extending across a corresponding width dimension of the manway opening, wherein: the length dimension of the manway unit is greater than the corresponding length dimension of the manway opening; and the width dimension of the manway unit is greater than the corresponding width dimension of the manway opening.

12. A method of opening and/or closing a manway unit of the fractionation tray of claim 1, the method comprising the step of:
(i) opening and/or closing the manway unit by rotating the finger elements of the first manway panel within the apertures of the adjacent fractionation tray panel(s), thereby opening and/or closing the manway unit of the fractionation tray.

13. The method of claim 12, wherein the manway unit remains engaged with the fractionation tray and in alignment with the manway opening when opening the manway unit.

14. A fractionation column comprising one or more fractionation trays of claim 1.

15. A method of human travel within the fractionation column of claim 14, the method comprising the human performed steps of:
(i) entering the fractionation column;
(ii) opening a manway unit of a first fractionation tray by rotating the finger elements of the manway panel within the apertures of the adjacent fractionation tray panel(s); and
(iii) traveling through the manway unit of the first fractionation tray,
thereby allowing human travel through the fractionation column.

16. The method of claim 15, further comprising the human performed steps of:
(iv) opening a manway unit of a second fractionation tray by rotating the finger elements of the manway panel within the apertures of the adjacent fractionation tray panel(s); and
(v) traveling through the manway unit of the second fractionation tray.

17. A method of retrofitting a fractionation tray having an existing manway unit with a new manway unit, the method comprising the steps of:
(i) providing a fractionation tray having the existing manway unit positioned to cover a manyway opening of the fractionation tray, wherein:
the manway opening is framed by one or more fractionation tray panels having apertures through the panel(s) from one major surface to another major surface adjacent to the manway opening, and
the exiting manway unit is secured to the fractionation tray by one or more bolting assemblies disposed through the apertures;
(ii) removing, sliding away, or turning away the one or more bolting assemblies and removing the existing manway unit from the fractionation tray;
(iii) providing a new manway unit, the new manway unit comprising; and
finger elements extending from the second side edge, wherein the finger elements of the second side edge are configured to be received within the apertures adjacent to a first side of the manway opening,
wherein the manway unit is configured to open and close by rotation of the finger elements with the apertures, and
(iv) installing the new manway unit by inserting finger elements of the first manway panel into the apertures of the adjacent fractionation tray panel(s),
thereby retrofitting a fractionation tray having an existing manway unit with a new manway unit.

18. The method of claim 17, wherein the method requires the provision of no additional hardware except for the new manway unit itself.

19. The method of claim 17, wherein the method requires no additional modifications to the fractionation tray other than those listed in steps (ii) through (iv).

20. The method of claim 17, wherein the fractionation tray is located within a fractionation column.

21. A method of retrofitting a fractionation tray having an existing manway unit, the method comprising the steps of:
(i) providing a fractionation tray having the existing manway unit positioned to cover a manway opening of the fractionation tray, wherein:
the manway opening is framed by one or more fractionation tray panels having apertures through the panel(s) from one major surface to another major surface adjacent to the manway opening, and
the existing manway unit having a first manway panel secured to the fractionation tray by one or more bolting assemblies disposed through the apertures;
the first manway panel having perforations for the passage of fluid and first and second opposing side edges and two opposing end edges;
(ii) removing, sliding away, or turning away the one or more bolting assemblies and removing the existing manway unit from the fractionation tray;
(iii) installing finger elements on one or more sides of the manway panel(s) thereby creating a modified manway unit, wherein the modified manway unit is configured to open and close by rotation of the finger elements within the apertures, and
(iv) installing the modified manway unit by inserting the finger elements into the apertures of the adjacent fractionation tray panel(s),
thereby retrofitting a fractionation tray having an existing manway unit.

22. The method of claim 21, wherein the method requires the provision of no additional hardware except for the finger elements.

23. The method of claim 21, wherein the method requires no additional modifications to the fractionation tray other than those listed in steps (ii) through (iv).

* * * * *

UNITED STATES PATENT AND TRADEMARK OFFICE
CERTIFICATE OF CORRECTION

| | | |
|---|---|---|
| PATENT NO. | : 9,849,403 B2 | Page 1 of 1 |
| APPLICATION NO. | : 14/714865 | |
| DATED | : December 26, 2017 | |
| INVENTOR(S) | : Daniel Richard Summers et al. | |

It is certified that error appears in the above-identified patent and that said Letters Patent is hereby corrected as shown below:

In the Claims

Column 11, Line(s) 61-64, Claim 17 should read:
... a first manway panel comprising:
    perforations for the passage of fluid;
    first and second opposing side edges and two opposing end edges; and ...

Signed and Sealed this
Twenty-second Day of May, 2018

Andrei Iancu
*Director of the United States Patent and Trademark Office*